(No Model.)
D. DURKIN.
LOOM TEMPLE.
No. 503,906. Patented Aug. 22, 1893.
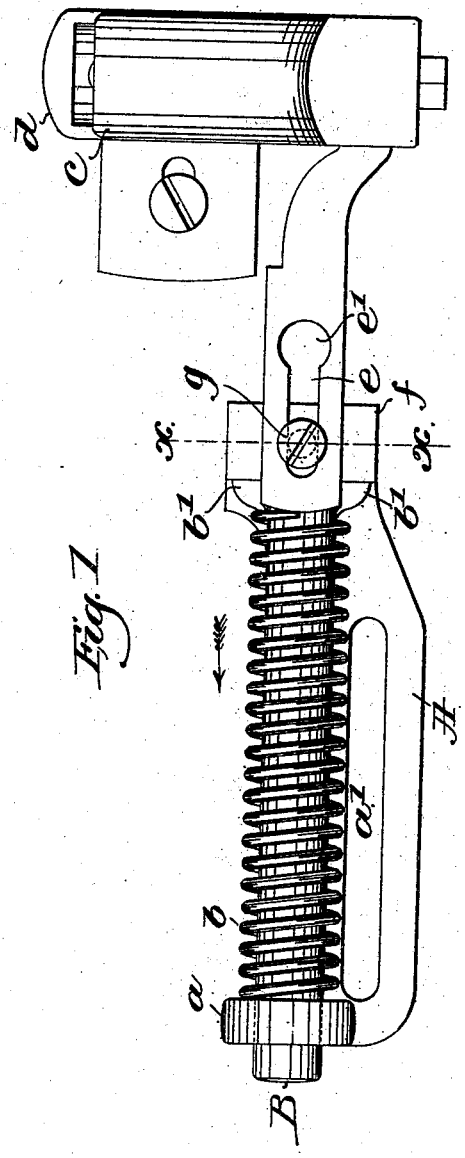
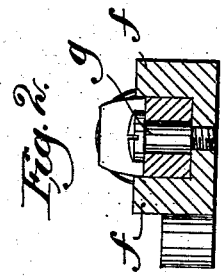
Witnesses.
Edward F. Allen.
Louis N. Gowell
Inventor:
Daniel Durkin.
By Crosby & Gregory. Attys.

UNITED STATES PATENT OFFICE.

DANIEL DURKIN, OF WEST UPTON, ASSIGNOR TO THE DUTCHER TEMPLE COMPANY, OF HOPEDALE, MASSACHUSETTS.

LOOM-TEMPLE.

SPECIFICATION forming part of Letters Patent No. 503,906, dated August 22, 1893.

Application filed May 2, 1893. Serial No. 472,704. (No model.)

*To all whom it may concern:*

Be it known that I, DANIEL DURKIN, of West Upton, county of Worcester, State of Massachusetts, have invented an Improvement in Loom-Temples, of which the following description, in connection with the accompanying drawings, is a specification, like letters on the drawings representing like parts.

In weaving, when a weft erroneously put into the shed has to be picked out by hand, it is common to push back the temple engaging the selvages of the cloth until a suitable projection on the temple catches against a suitable stop on the base plate or frame in which the shank of the temple reciprocates. For some classes of work, I have found it of great convenience to be enabled to entirely remove the temple from its stand or plate in which the shank of the temple reciprocates.

Figure 1, in plan view, represents a temple embodying my invention; and Fig. 2, a section thereof in the line $x$.

The stand A having a bearing $a$ and slotted at $a'$ for the reception of an adjusting screw or device by which to attach the stand to the breast beam of a loom; the shank B and its surrounding spring $b$ acting normally to keep the temple head forward; and the temple head composed essentially of a cap $c$ and a pod $d$ between which, in practice, will be contained the usual roller temple, are and may be all as usual in loom temples.

In my invention, I have provided the shank of the temple with a slot $e$ having at one end an enlargement $e'$, and instead of having the cap cross from the upright guides $f$, $f$, which guide the sides of the bar in its reciprocations, as in ordinary loom temples, I have provided the stand with a stud screw $g$, the head of which is of larger diameter than the width of the slot $e$, the opening $e'$ of the slot being, however, of greater diameter than the head of the stud screw. The spring $b$ acts normally to keep the wings or projections $b'$ of the temple bar against the uprights $f$, but when it is desired on the occurrence of a mispick or otherwise, to remove the temple from the breast beam, it is only necessary to push upon the temple and move it in the direction of the arrow Fig. 1 until the large or eye-part $e'$ of the slot comes in line with and under the head of the stud screw, when the shank of the temple may be readily lifted from between the guides $f$, and the rear end of the shank be pulled out of the bearing $a$.

The stud screw $g$ constitutes a locking device to keep the shank of the temple down in its guides in the stand during its regular working. This invention is not, however, limited to the exact shape shown for the locking device, as it will be obvious that other forms of locking devices might be employed which in certain positions of the parts would enable the shank of the temple to be lifted over the locking device.

Having described my invention, what I claim as new, and desire to secure by Letters Patent, is—

In a loom temple, a stand, a temple head having a slotted shank, and a locking device co-operating with the slot in the shank to retain the shank in the said stand in certain positions of the shank and permit the shank to be removed from the stand and locking device in other positions, for the purposes set forth.

In testimony whereof I have signed my name to this specification in the presence of two subscribing witnesses.

DANIEL DURKIN.

Witnesses:
GEO. E. STIMPSON,
FRANK J. DUTCHER.